(12) United States Patent
Zyskowski et al.

(10) Patent No.: US 9,008,966 B2
(45) Date of Patent: Apr. 14, 2015

(54) ROUTE-BASED MODIFICATIONS TO A MAP

(75) Inventors: Jamie Zyskowski, Seattle, WA (US); Jonah Jones, Darlinghurst (AU); Scott Shawcroft, Seattle, WA (US); Christopher Gonterman, Seattle, WA (US); David Teitlebaum, Seattle, WA (US); Yatin Chawathe, Seattle, WA (US)

(73) Assignee: Google Inc., Mountain View, CA (US)

( * ) Notice: Subject to any disclaimer, the term of this patent is extended or adjusted under 35 U.S.C. 154(b) by 218 days.

(21) Appl. No.: 13/527,531

(22) Filed: Jun. 19, 2012

(65) Prior Publication Data

US 2013/0338918 A1    Dec. 19, 2013

(51) Int. Cl.
*G01C 21/00* (2006.01)
*G01C 21/32* (2006.01)
*G01C 21/36* (2006.01)

(52) U.S. Cl.
CPC .............. *G01C 21/32* (2013.01); *G01C 21/367* (2013.01)

(58) Field of Classification Search
USPC ......... 701/533, 400, 408–411, 413, 418, 425, 701/426, 429, 438, 440, 445, 447; 340/995.16, 995.17, 995.23, 995.25, 340/995.12, 995.19, 995.24
See application file for complete search history.

(56) References Cited

U.S. PATENT DOCUMENTS

| | | | |
|---|---|---|---|
| 6,282,489 B1 | 8/2001 | Bellesfield et al. | |
| 6,954,697 B1 | 10/2005 | Smith | |
| 7,133,775 B2 | 11/2006 | Adamski et al. | |
| 7,194,357 B2 | 3/2007 | Smith | |
| 8,577,603 B2 * | 11/2013 | Hirai et al. | 701/438 |
| 8,606,493 B1 * | 12/2013 | Gold et al. | 701/400 |
| 2005/0137791 A1 | 6/2005 | Agrawal et al. | |
| 2007/0010941 A1 * | 1/2007 | Marsh | 701/209 |
| 2008/0262717 A1 * | 10/2008 | Ettinger | 701/206 |
| 2010/0332324 A1 | 12/2010 | Khosravy et al. | |
| 2011/0106429 A1 | 5/2011 | Poppen et al. | |
| 2012/0059584 A1 | 3/2012 | Nesbitt et al. | |
| 2012/0150436 A1 | 6/2012 | Rossano et al. | |

\* cited by examiner

*Primary Examiner* — Dalena Tran
(74) *Attorney, Agent, or Firm* — Dority & Manning, P.A.

(57) ABSTRACT

Systems and methods for applying one or more route-based modifications to a map are provided. In some aspects, a system includes a pathfinder module configured to determine a primary route from a beginning point to a destination point on the map. The pathfinder module is further configured to generate one or more primary modifications to the map based on the primary route. The system also includes a restyling module configured to apply the primary route and the one or more primary modifications to the map. The one or more primary modifications include at least one of a) adding a first object to the map that would otherwise be excluded from the map if the primary route is not applied to the map and b) excluding a second object from the map that would otherwise be added to the map if the primary route is not applied to the map.

14 Claims, 4 Drawing Sheets

ROUTE-BASED MODIFICATIONS TO A MAP

FIELD

The subject technology generally relates to mapping applications and, in particular, relates to route-based modifications to a map.

BACKGROUND

Mapping applications typically display a large amount of information to a user when the user requests directions from a beginning point to a destination point. This information may include various points of interest around a given route from the beginning point to the destination point, in addition to street names for every single street near the given route. However, this information may be redundant and/or not necessarily relevant to the user. As a result, the large amount of information displayed on the map may be both unhelpful and distracting to the user.

SUMMARY

According to various aspects of the subject technology, a system for applying one or more route-based modifications to a map is provided. The system comprises a pathfinder module configured to determine a primary route from a beginning point to a destination point on the map. The pathfinder module is further configured to generate one or more primary modifications to the map based on the primary route. The system also comprises a restyling module configured to apply the primary route and the one or more primary modifications to the map. The one or more primary modifications include at least one of a) adding a first object to the map that would otherwise be excluded from the map if the primary route is not applied to the map and b) excluding a second object from the map that would otherwise be added to the map if the primary route is not applied to the map. The first object includes a restyling of a landmark.

According to various aspects of the subject technology, a computer-implemented method for applying one or more route-based modifications to a map is provided. The method comprises determining a primary route from a beginning point to a destination point on the map. The method also comprises generating one or more primary modifications to the map based on the primary route. The method also comprises applying the primary route and the one or more primary modifications to the map. The one or more primary modifications include at least one of a) adding a first object to the map that would otherwise be excluded from the map if the primary route is not applied to the map and b) excluding a second object from the map that would otherwise be added to the map if the primary route is not applied to the map. The method also comprises determining an alternate route from the beginning point to the destination point, and generating one or more alternate modifications to the map based on the alternate route. The method also comprises applying the alternate route and the one or more alternate modifications to the map. The one or more alternate modifications include at least one of i) adding a third object to the map that would otherwise be excluded from the map if the alternate route is not applied to the map and ii) excluding a fourth object from the map that would otherwise be added to the map if the alternate route is not applied to the map.

According to various aspects of the subject technology, a machine-readable medium encoded with executable instructions for applying one or more route-based modifications to a map is provided. The instructions comprising code for determining a primary route from a beginning point to a destination point on the map. The instructions also comprise code for generating one or more primary modifications to the map based on at least one of the primary route, a mode of transportation from the beginning point to the destination point, a zoom level of the map, a type of destination at the destination point, and a user of the map. The instructions also comprise code for applying the primary route and the one or more primary modifications to the map. The one or more primary modifications include at least one of a) adding a first object to the map that would otherwise be excluded from the map if the primary route is not applied to the map and b) excluding a second object from the map that would otherwise be added to the map if the primary route is not applied to the map. The instructions also comprise code for determining an alternate route from the beginning point to the destination point, and code for generating one or more alternate modifications to the map based on the alternate route. The instructions also comprise code for applying the alternate route and the one or more alternate modifications to the map, wherein the one or more alternate modifications include at least one of i) adding a third object to the map that would otherwise be excluded from the map if the alternate route is not applied to the map and ii) excluding a fourth object from the map that would otherwise be added to the map if the alternate route is not applied to the map. The one or more primary modifications, the one or more alternate modifications, the primary route, and the alternate route are applied at the same time.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, to one ordinarily skilled in the art that the subject technology may be practiced without some of these specific details. In other instances, well-known structures and techniques have not been shown in detail so as not to obscure the subject technology.

According to certain aspects of the subject technology, systems and methods are provided for applying one or more route-based modifications to a map such that information displayed to the user on the map is relevant to the user's request for directions. The user, via a client (e.g., a laptop computer, a desktop computer, a netbook, a mobile device, a tablet, etc.), may submit a request to a server for directions from a beginning point to a destination point. A pathfinder module of the server may receive the request and generate a primary route from the beginning point to the destination point. The pathfinder module may also generate one or more modifications to the map so that information relevant to the user is displayed while information that is not relevant to the user is excluded from the map. A restyling module of the server may then apply the primary route and the one or more modifications to the map, and then provide this map to the client.

The one or more modifications to the map may be specific to the primary route, and therefore can enable only information relevant to the primary route to be displayed to the user. For example, major streets, cities, and/or landmarks that are near or along the primary route may be displayed to the user, while lesser known streets and cities are not displayed. In some aspects, only points of interest that are relevant to the destination point are displayed. For example, if the destination point is a restaurant, then other similar restaurants may be displayed near the primary route, in addition to parking structures near the destination point. In some aspects, the pathfinder module may generate an alternate route between the beginning point and the destination point. Other modifications to the map based on this alternate route may also be displayed on the map.

Figure 1:
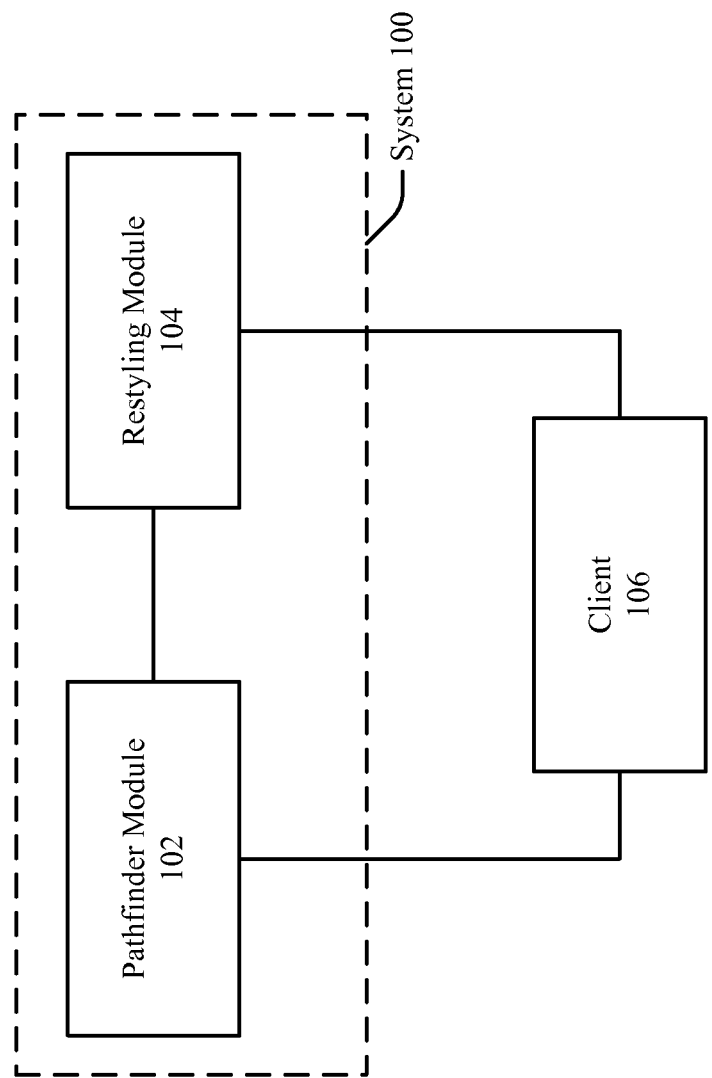
FIG. 1 illustrates an example of a system for applying one or more route-based modifications to a map, in accordance with various aspects of the subject technology.

FIG. 1 illustrates an example of system 100 for applying one or more route-based modifications to a map, in accordance with various aspects of the subject technology. System 100 is an example of the server that provides the map, on which the primary route and the one or more modifications are applied, to client 106. Client 106, for example, may comprise a web browser that allows the user to view and use the map. System 100 comprises pathfinder module 102 and restyling module 104. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 2:
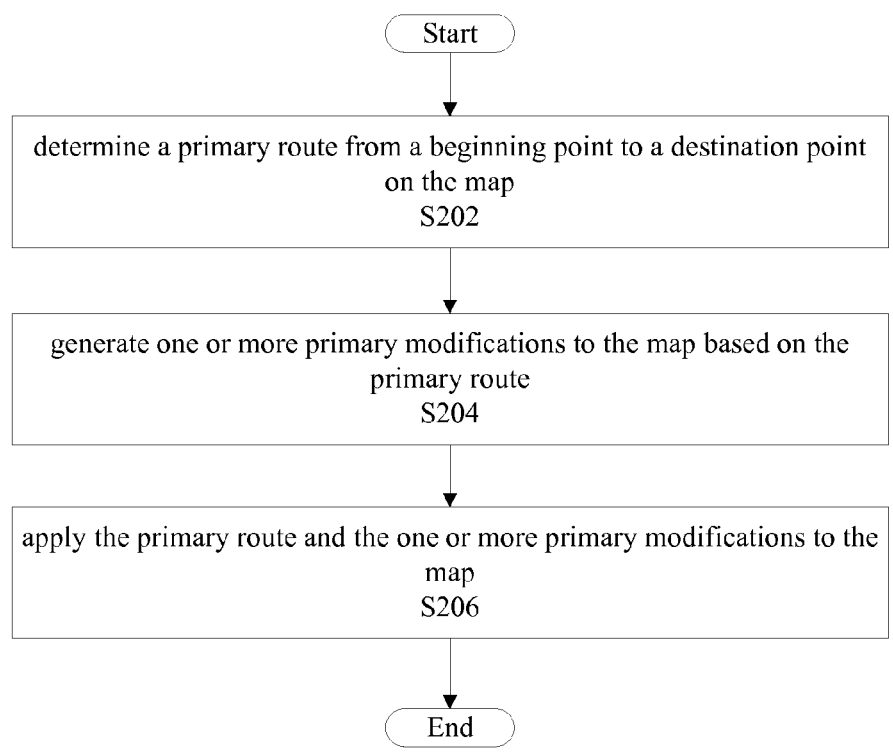
FIG. 2 illustrates an example of a method for applying one or more route-based modifications to a map, in accordance with various aspects of the subject technology.

FIG. 2 illustrates an example of method 200 for applying one or more route-based modifications to a map, in accordance with various aspects of the subject technology. As discussed above, a user may submit a request, via client 106, to system 100 for directions from a beginning point to a destination point. Pathfinder module 102 may receive the request and according to step S202, determine a primary route from the beginning point to the destination point on the map.

Figure 3:
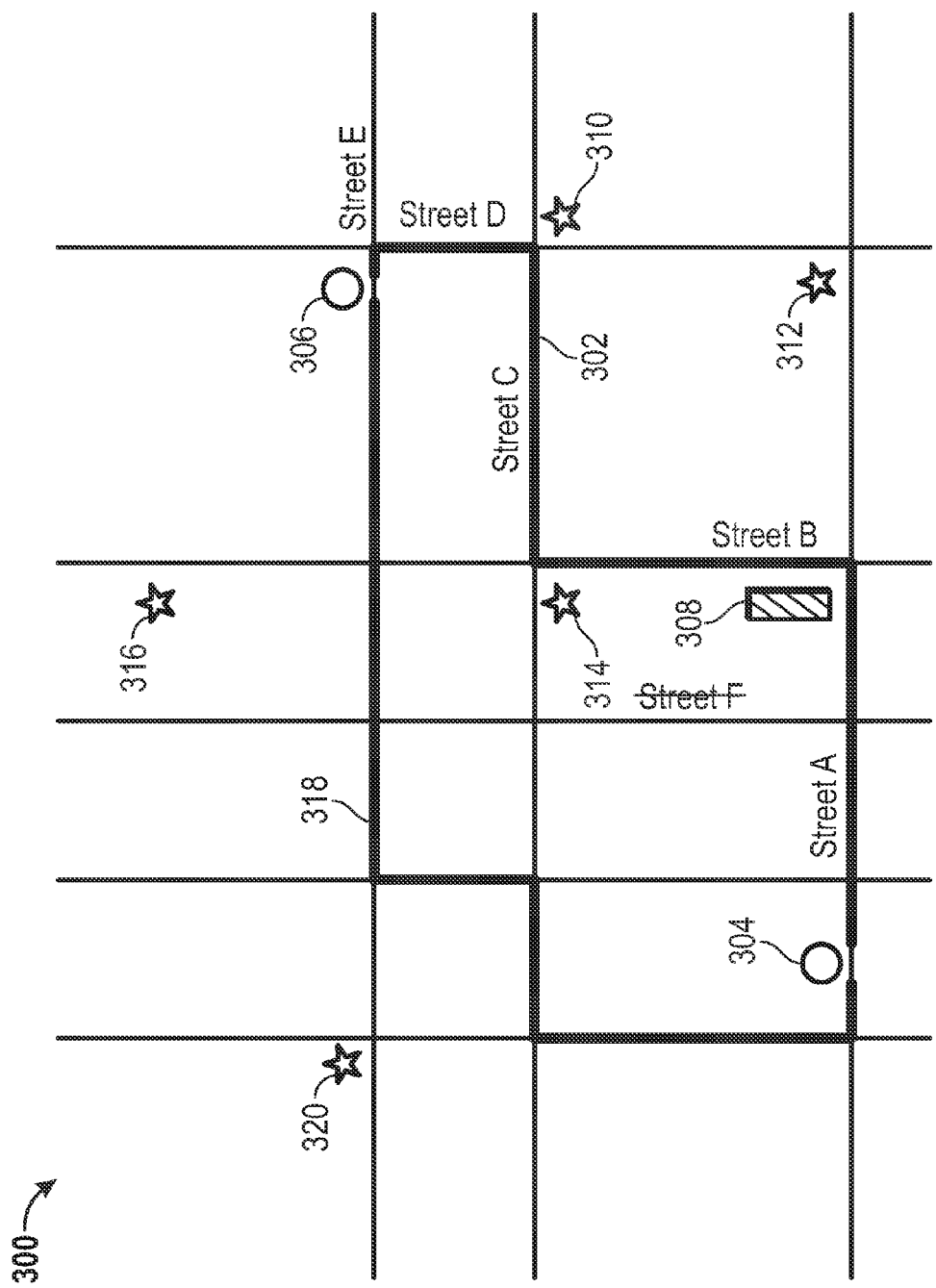
FIG. 3 illustrates an example of a map, in accordance with various aspects of the subject technology.

FIG. 3 illustrates an example of map 300 and primary route 302 between beginning point 304 and destination point 306, in accordance with various aspects of the subject technology. As shown, primary route 302 runs along Street A, Street B, Street C, Street D, and Street E before reaching destination point 306. After determining primary route 302, pathfinder module 102 may transmit primary route 302 and a token representing primary route 302 to client 106.

With knowledge of primary route 302, client 106 may then be able to determine which portions of map 300 (e.g., map tiles) are needed to display primary route 302. For example, the web browser of client 106 (e.g., a Java-scripted web browser) may load a set of map tiles on which primary route 302 can be displayed. In this regard, client 106 may provide primary route 302, the token representing primary route 302, and/or the set of map tiles to restyling module 104. Restyling module 104 may provide this information to pathfinder module 102, which can generate one or more primary modifications to map 300 with knowledge of which portions of map 300 may display primary route 302.

Referring back to FIGS. 1 and 2, according to step S204, pathfinder module 102 may generate one or more primary modifications to map 300 based on primary route 302. According to certain aspects, the one or more primary modifications may include at least one of a) adding a first object to map 300 that would otherwise be excluded from map 300 if primary route 302 is not applied to map 300 and b) excluding a second object from map 300 that would otherwise be added to map 300 if primary route 302 is not applied to map 300. The one or more modifications may allow only information relevant to primary route 302 to be displayed on map 300. For example, the first object may include at least one of a street name, a point of interest, a distance to the destination point, an estimated time of arrival at the destination point, a restyling of a landmark, a traffic hazard indicator, a traffic indicator, and other objects relevant to the user's travel from beginning point 304 to destination point 306. The second object may include at least one of a street name, a point of interest, and other objects that may not be relevant to the user and can be excluded.

FIG. 3 illustrates examples of objects that may be added to and/or excluded from map 300 as primary modifications. For example, the labels of Street A, Street B, Street C, Street D, and Street E may be added, as the user may need to travel along these streets to reach destination point 306. A label for a street that is not relevant to primary route 302 may be excluded from map 300, such as the label for Street F (shown with a strikethrough to indicate that it has been excluded from map 300).

According to certain aspects, landmark 308 may be added as a primary modification. Landmark 308 is shown as a building. However, other types of landmarks can be added such as a bridge, a sign, a park, or other artificial or natural structures. In some aspects, a primary modification to map 300 may comprise a restyling of landmark 308. For example, landmark 308 may be highlighted, colored, or shaded to direct the user's attention to landmark 308. This may be useful, for example, if primary route 302 is used to guide the user to make a certain action at landmark 308. By highlighting, coloring, and/or shading landmark 308, the user is able to see on map 300 where to take the action (e.g., turning left at landmark 308). This landmark-based guidance may be particularly useful in areas where street signs are unavailable or not clearly visible.

In some aspects, the one or more primary modifications can be based on other criteria such as a mode of transportation from beginning point 304 to destination point 306, a zoom level of map 300, a type of destination at destination point 306, and/or the user of map 300. For example, if the mode of transportation by the user to destination point 306 is by vehicle, then point of interest 310 that represents a parking lot or a gas station may be added as a primary modification. If the mode of transportation is by walking, then point of interest 310 may be excluded, because the parking lot or gas station would presumably be irrelevant to the user.

In another example, a primary modification may be added to or excluded from map 300 depending on a zoom level of map 300. If the user is zoomed in closer to a map, then objects that are farther away from primary route 302 may be excluded. For example, point of interest 312 may be excluded from map 300 because point of interest 312 is relatively farther away from primary route 302 compared to point of interest 310.

A primary modification can also be based on the type of destination at destination point 306. An object that is similar to the type of destination at destination point 306 may be added. For example, if destination point 306 is a restaurant, then other similar restaurants (e.g., in terms of the food of the restaurant, a size of the restaurant, and/or the price of the restaurant) can be added to map 300. Point of interest 314 may represent an object that is similar to the type of destination at destination point 306.

In some aspects, a primary modification can be based on who the user is. If an object is relevant to the user in some manner, then it can be added to map 300 as well. For example, point of interest 316 may be specific to the user, and may represent a residence of the user's friend or relative, the user's workplace or school, a place that the user has previously indicated an interest in (e.g., a park, a store, etc.), or other places relevant to the user.

Although primary route 302 and the one or more primary modifications have been described, pathfinder module 102 may also determine alternate route 318 from beginning point 304 to destination point 306 and generate one or more alternate modifications to map 300 based on alternate route 318. Alternate route 318 may provide the user with an alternate way to travel from beginning point 304 to destination point 306 in a manner that can be more beneficial than traveling by primary route 302. For example, alternate route 318 may be useful to avoid traffic or traffic hazards along primary route 302, to allow the user to arrive at destination point 306 sooner than traveling along primary route 302, or to allow the user to travel by another point of interest 320 that may be specific to the user. The one or more alternate modifications may be the same type of modifications to alternate route 318 as the one or more primary modifications are to primary route 302.

Once pathfinder module 102 has generated the one or more primary modifications and/or the one or more alternate modifications, pathfinder module 102 may provide the one or more primary modifications and/or the one or more alternate modifications to restyling module 104. Returning to FIGS. 1 and 2, according to step S206, restyling module 104 may apply primary route 302 and the one or more primary modifications to map 300. For example, restyling module 104 may draw, render, or otherwise integrate primary route 302 and the one or more primary modifications onto map 300. This restyled map 300 may then be transmitted to client 106, to allow the user to use the restyled map 300 to travel from beginning point 304 to destination point 306.

In some aspects, restyling module 104 may apply the one or more primary modifications to map 300 when primary route 302 is applied to map 300. For example, restyling module 104 may add the first object to map 300 when primary route 302 is applied to map 300, and/or exclude the second object from map 300 when primary route 302 is applied to map 300.

According to certain aspects, restyling module 104 may also apply alternate route 318 and the one or more alternate modifications to map 300. Restyling module 104 may apply primary route 302, alternate route 318, the one or more primary modifications, and/or the one or more alternate modifications at the same time. Thus, at least two or more of primary route 302, alternate route 318, the one or more primary modifications, and the one or more alternate modifications may be displayed to the user on map 300. In some aspects, primary route 302 and alternate route 318 may be in a different styling from one another. For example, primary route 302 and alternate route 318 may be in different colors, shadings, or patterns.

Figure 4:
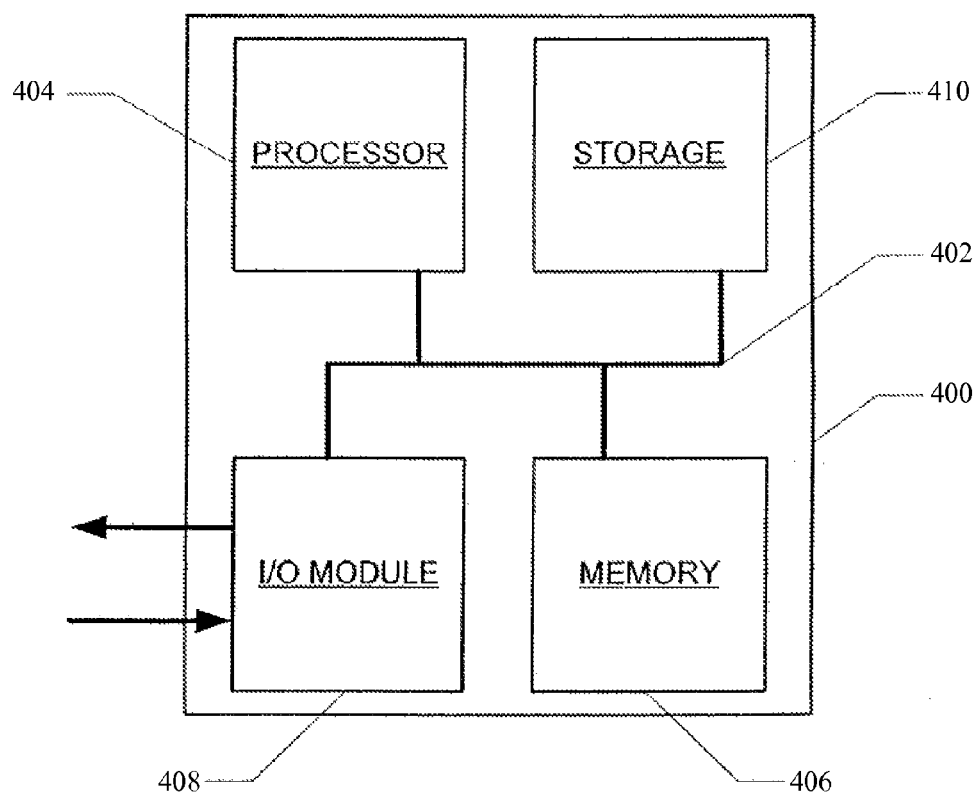
FIG. 4 is a block diagram illustrating components of a controller, in accordance with various aspects of the subject disclosure.

FIG. 4 is a block diagram illustrating components of controller 400, in accordance with various aspects of the subject disclosure. Controller 400 comprises processor module 404, storage module 410, input/output (I/O) module 408, memory module 406, and bus 402. Bus 402 may be any suitable communication mechanism for communicating information. Processor module 404, storage module 410, I/O module 408, and memory module 406 are coupled with bus 402 for communicating information between any of the modules of controller 400 and/or information between any module of controller 400 and a device external to controller 400. For example, information communicated between any of the modules of controller 400 may include instructions and/or data. In some aspects, bus 402 may be a universal serial bus. In some aspects, bus 302 may provide Ethernet connectivity.

In some aspects, processor module 404 may comprise one or more processors, where each processor may perform different functions or execute different instructions and/or processes. For example, one or more processors may execute instructions for operating system 100, one or more processors may execute instructions for applying one or more route-based modifications to a map (e.g., method 200 in FIG. 2), and one or more processors may execute instructions for input/output functions.

Memory module 406 may be random access memory ("RAM") or other dynamic storage devices for storing information and instructions to be executed by processor module 404. Memory module 406 may also be used for storing temporary variables or other intermediate information during execution of instructions by processor 404. In some aspects, memory module 406 may comprise battery-powered static RAM, which stores information without requiring power to maintain the stored information. Storage module 410 may be a magnetic disk or optical disk and may also store information and instructions. In some aspects, storage module 410 may comprise hard disk storage or electronic memory storage (e.g., flash memory). In some aspects, memory module 406 and storage module 410 are both a machine-readable medium.

Controller 400 is coupled via I/O module 408 to a user interface for providing information to and receiving information from an operator of system 100. For example, the user interface may be a cathode ray tube ("CRT") or LCD monitor for displaying information to an operator. The user interface may also include, for example, a keyboard or a mouse coupled to controller 400 via I/O module 408 for communicating information and command selections to processor module 404.

According to various aspects of the subject disclosure, methods described herein are executed by controller 400. Specifically, processor module 404 executes one or more sequences of instructions contained in memory module 406 and/or storage module 410. In one example, instructions may be read into memory module 406 from another machine-readable medium, such as storage module 410. In another example, instructions may be read directly into memory module 406 from I/O module 408, for example from an operator of system 100 via the user interface. Execution of the sequences of instructions contained in memory module 406 and/or storage module 410 causes processor module 404 to perform methods to apply one or more route-based modifications to a map. For example, a computational algorithm for applying one or more route-based modifications to a map may be stored in memory module 406 and/or storage module 410 as one or more sequences of instructions. Information the primary route, the one or more primary modifications, the token representing the primary route, the alternate route, the one or more alternate modifications, or other suitable information may be communicated from processor module 404 to memory module 406 and/or storage module 410 via bus 402 for storage. In some aspects, the information may be communicated from processor module 404, memory module 406, and/or storage module 410 to I/O module 408 via bus 402. The information may then be communicated from I/O module 408 to an operator of system 100 via the user interface.

One or more processors in a multi-processing arrangement may also be employed to execute the sequences of instructions contained in memory module 406 and/or storage module 410. In some aspects, hard-wired circuitry may be used in place of or in combination with software instructions to implement various aspects of the subject disclosure. Thus, aspects of the subject disclosure are not limited to any specific combination of hardware circuitry and software.

The term "machine-readable medium," or "computer-readable medium," as used herein, refers to any medium that participates in providing instructions to processor module 404 for execution. Such a medium may take many forms, including, but not limited to, non-volatile media, and volatile media. Non-volatile media include, for example, optical or magnetic disks, such as storage module 410. Volatile media include dynamic memory, such as memory module 406. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for applying one or more route-based modifications to a map, the system comprising:
   a pathfinder module, implemented using one or more processors, configured to:
      determine a primary route from a beginning point to a destination point on the map and generate one or more primary modifications to the map based on the primary route, and
      determine an alternate route from the beginning point to the destination point and generate one or more alternate modifications to the map based on the alternate route, wherein the one or more primary modifications or the one or more alternate modifications display information relevant to a user or exclude information not relevant to the user from the map; and
   a restyling module, implemented using the one or more processors, configured to:
      apply the primary route and the one or more primary modifications to the map, wherein the one or more primary modifications include at least one of a) adding a first object to the map that would otherwise be excluded from the map if the primary route is not applied to the map and b) excluding a second object from the map that would otherwise be added to the map if the primary route is not applied to the map, apply the alternate route and the one or more alternate modifications to the map, wherein the one or more alternate modifications include at least one of i) adding a third object to the map that would otherwise be excluded from the map if the alternate route is not applied to the map and ii) excluding a fourth object from the map that would otherwise be added to the map if the alternate route is not applied to the map, wherein the first object includes a restyling of a landmark, wherein the restyling module is configured to apply the one or more primary modifications, the one or more alternate modifications, the primary route, and the alternate route at the same time.

2. The system of claim 1, wherein the restyling module is configured to apply the one or more primary modifications to the map when the primary route is applied to the map.

3. The system of claim 1, wherein the first object further includes at least one of a street name, a point of interest, a distance to the destination point, an estimated time of arrival at the destination point, a traffic hazard indicator, and a traffic indicator.

4. The system of claim 3, wherein the point of interest is user-specific.

5. The system of claim 1, wherein the landmark comprises at least one of an artificial structure and a natural structure.

6. The system of claim 1, wherein the restyling of the landmark comprises at least one of a coloring and a shading of the landmark.

7. The system of claim 1, wherein the second object includes at least one of a street name and a point of interest.

8. The system of claim 1, wherein the pathfinder module is configured to generate the one or more primary modifications based on at least one of a mode of transportation from the beginning point to the destination point, a zoom level of the map, a type of destination at the destination point, and the user of the map.

9. The system of claim 1, wherein the pathfinder module is further configured to determine the alternate route from the beginning point to the destination point, and to generate one or more alternate modifications to the map based on the alternate route.

10. The system of claim 9, wherein restyling module is configured to apply the primary route and the alternate route in a different styling from one another.

11. A computer-implemented method for applying one or more route-based modifications to a map, the method comprising:

determining, using one or more processors, a primary route from a beginning point to a destination point on the map;

generating, using the one or more processors, one or more primary modifications to the map based on the primary route;

applying, using the one or more processors, the primary route and the one or more primary modifications to the map, wherein the one or more primary modifications include at least one of a) adding a first object to the map that would otherwise be excluded from the map if the primary route is not applied to the map and b) excluding a second object from the map that would otherwise be added to the map if the primary route is not applied to the map;

determining, using the one or more processors, an alternate route from the beginning point to the destination point;

generating, using the one or more processors, one or more alternate modifications to the map based on the alternate route; and applying the alternate route and the one or more alternate modifications to the map, wherein the one or more primary modifications or the one or more alternate modifications display information relevant to a user or exclude information not relevant to the user from the map, wherein the one or more alternate modifications include at least one of i) adding a third object to the map that would otherwise be excluded from the map if the alternate route is not applied to the map and ii) excluding a fourth object from the map that would otherwise be added to the map if the alternate route is not applied to the map, wherein the one or more primary modifications, the one or more alternate modifications, the primary route, and the alternate route are applied at the same time.

12. The method of claim 11, wherein the one or more primary modifications are generated based on at least one of a mode of transportation from the beginning point to the destination point, a zoom level of the map, a type of destination at the destination point, and a user of the map.

13. The method of claim 11, wherein the first object includes a restyling of a landmark, the restyling of the landmark comprising at least one of a coloring and a shading of the landmark.

14. A non-transitory machine-readable medium comprising instructions stored therein, which when executed by one or more processors, cause the one or more processors to perform operations comprising:

determining, using the one or more processors, a primary route from a beginning point to a destination point on the map;

generating, using the one or more processors, one or more primary modifications to the map based on at least one of the primary route, a mode of transportation from the beginning point to the destination point, a zoom level of the map, a type of destination at the destination point, and a user of the map;

applying, using the one or more processors, the primary route and the one or more primary modifications to the map, wherein the one or more primary modifications include at least one of a) adding a first object to the map that would otherwise be excluded from the map if the primary route is not applied to the map and b) excluding a second object from the map that would otherwise be added to the map if the primary route is not applied to the map;

determining, using the one or more processors, an alternate route from the beginning point to the destination point;

generating, using the one or more processors, one or more alternate modifications to the map based on the alternate route; and applying, using the one or more processors, the alternate route and the one or more alternate modifications to the map, wherein the one or more primary modifications or the one or more alternate modifications display information relevant to a user or exclude information not relevant to the user from the map, wherein the one or more alternate modifications include at least one of i) adding a third object to the map that would otherwise be excluded from the map if the alternate route is not applied to the map and ii) excluding a fourth object from the map that would otherwise be added to the map if the alternate route is not applied to the map, wherein the one or more primary modifications, the one or more alternate modifications, the primary route, and the alternate route are applied at the same time.

\* \* \* \* \*